(12) United States Patent
Custer et al.

(10) Patent No.: US 8,187,525 B2
(45) Date of Patent: May 29, 2012

(54) METHOD OF FIRING GREEN BODIES INTO POROUS CERAMIC ARTICLES

(75) Inventors: Martha Blanche Custer, Painted Post, NY (US); Jennifer Lynn Lyon, Corning, NY (US); Jianguo Wang, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 303 days.

(21) Appl. No.: 12/229,828

(22) Filed: Aug. 27, 2008

(65) Prior Publication Data

US 2009/0062105 A1    Mar. 5, 2009

Related U.S. Application Data

(60) Provisional application No. 60/967,219, filed on Aug. 31, 2007.

(51) Int. Cl.
*C04B 33/32* (2006.01)
*C04B 35/64* (2006.01)
(52) U.S. Cl. ........................ 264/666; 264/631
(58) Field of Classification Search .................. 264/653, 264/631, 666
See application file for complete search history.

(56) References Cited

U.S. PATENT DOCUMENTS

| | | | | |
|---|---|---|---|---|
| 4,528,275 A | * | 7/1985 | Hodge | 501/9 |
| 5,039,637 A | * | 8/1991 | Hyuga et al. | 501/135 |
| 5,185,110 A | | 2/1993 | Hamaguchi et al. | |
| 5,262,102 A | | 11/1993 | Wada | 35/14 |
| 5,738,820 A | * | 4/1998 | Ukegawa et al. | 264/665 |
| 6,087,281 A | | 7/2000 | Merkel | 501/9 |
| 6,210,626 B1 | * | 4/2001 | Cornelius et al. | 264/631 |
| 6,541,407 B2 | | 4/2003 | Merkel et al. | 35/195 |
| 6,723,274 B1 | * | 4/2004 | Divakar | 264/662 |
| 6,773,481 B2 | | 8/2004 | Noguchi et al. | 39/20 |
| 6,803,086 B2 | | 10/2004 | Noguchi et al. | 428/116 |
| 6,864,198 B2 | | 3/2005 | Merkel | 35/195 |
| RE38,888 E | | 11/2005 | Beall et al. | 35/195 |
| 7,141,089 B2 | | 11/2006 | Beall et al. | 55/523 |
| 7,179,316 B2 | | 2/2007 | Merkel et al. | |
| 7,208,108 B2 | | 4/2007 | Otsuka et al. | |
| 2007/0006561 A1 | | 1/2007 | Brady et al. | 55/523 |
| 2007/0119134 A1 | | 5/2007 | Beall et al. | 55/523 |
| 2007/0119135 A1 | | 5/2007 | Miao et al. | 55/523 |
| 2007/0234693 A1 | | 10/2007 | Miao et al. | 55/523 |
| 2007/0261378 A1 | | 11/2007 | Miao et al. | 55/523 |

FOREIGN PATENT DOCUMENTS

| | | | |
|---|---|---|---|
| DE | 103 01 959 | 8/2003 | |
| WO | 2006/130759 | 12/2006 | 35/478 |

OTHER PUBLICATIONS

Shelby, James E. Introduction to Glass Science and Technology. Cambridge, The Royal Society of Chemistry, 1997. pp. 10-17.*

* cited by examiner

*Primary Examiner* — Matthew Daniels
*Assistant Examiner* — Erin Snelting
(74) *Attorney, Agent, or Firm* — Joseph M. Homa; Matthew J. Mason

(57) ABSTRACT

A method of forming a porous ceramic article having a narrow pore distribution includes heating a green body containing ceramic forming raw materials in a firing environment that raising the temperature of the firing environment to a peak temperature, then reducing the temperature to a hold temperature in order to form porous ceramic.

25 Claims, 4 Drawing Sheets

METHOD OF FIRING GREEN BODIES INTO POROUS CERAMIC ARTICLES

RELATED APPLICATIONS

This application claims the benefit of U.S. Provisional Application No. 60/967,219, filed Aug. 31, 2007, entitled "Method of Firing Green Bodies Into Porous Ceramic Articles."

BACKGROUND

The invention relates generally to methods of making porous ceramic bodies, such as are suitable for use in exhaust after-treatment applications. More specifically, the invention relates to methods for controlling pore distribution in porous ceramic bodies.

Porous ceramic bodies are used in a variety of applications, such as exhaust gas filtration applications. In exhaust gas filtration applications, the porous ceramic body contains an array of longitudinal channels defined by intersecting porous walls, which may be bare or coated with oxidation catalyst(s). The channels and walls are typically bounded by a circular or oval skin. For particulate filtration, the channels may be divided into inlet and outlet channels, where the inlet channels are plugged at an outlet end of the porous ceramic body, and the outlet channels are plugged at an inlet end of the ceramic body. Exhaust gas enters the ceramic body through the unplugged ends of the inlet channels, passes through the porous walls into the outlet channels, and exits through the unplugged ends of the outlet channels. With each pass of the exhaust gas through the porous ceramic body, the porous walls collect an amount of particulates from the exhaust gas.

The filtration efficiency of the porous ceramic body is directly proportional to the fraction of particulates collected from the exhaust gas. A diesel particulate filter composed of a porous ceramic body ideally combines high filtration efficiency, low coefficient of thermal expansion for thermal durability, narrow pore distribution and large pore size for low backpressure drop, high strength for structural durability, and low cost. In diesel exhaust filtration, cordierite has been the ceramic material of choice because it is a relatively low-cost material and offers a relatively low coefficient of thermal expansion.

SUMMARY

A method is disclosed herein of forming a porous ceramic article having a narrow pore size distribution which comprises heating a green body containing ceramic-forming raw materials including inorganic components from an initial temperature to a peak temperature at a first average rate, wherein the peak temperature is a temperature above which a ceramic phase will form, cooling the green body from the peak temperature to a second temperature at a second average rate, wherein the second temperature is a temperature in a range of temperatures at which the ceramic phase will form, and by holding the green body on average at the second temperature for a time sufficient to form the ceramic phase, thereby forming the porous ceramic article. The peak temperature is at least 5° C. above the second temperature. In some embodiments suitable for the formation of porous cordierite, the peak temperature is between 1430 and 1440° C., the second temperature is between 1415 and 1430° C., and the peak temperature is at least 5° C. above the second temperature.

In one aspect, a method is disclosed herein of manufacturing an article of porous ceramic material, the method comprising: providing a green body comprised of inorganic ceramic-forming components; heating the green body by exposing the green body to a firing environment comprising a fast-ramp stage followed by a hold stage, wherein the temperature of the firing environment in the hold stage is held between an upper soak temperature and a lower soak temperature, wherein the fast ramp stage comprises a peak portion, wherein the temperature of the firing environment in the peak portion is at all points in the peak portion greater than the upper soak temperature, the peak portion comprising a peak temperature, wherein the upper soak temperature is at least 5° C. below the peak temperature. Preferably, the peak temperature is greater than the amorphous-phase glass transition temperature and less than the melting point temperature of the ceramic; in some embodiments, the peak temperature is about 10° C. or more below the melting point of a predominant solid crystal phase of the ceramic material; in other embodiments, the peak temperature is about 10 to 20° C. less than the melting point of a predominant solid crystal phase of the ceramic material; in other embodiments, the peak temperature is no less than 1420 and no more than 1435° C. In some embodiments, the upper soak temperature is at least 10° C. below the peak temperature, in other embodiments at least 15° C. below the peak temperature, in some embodiments less than 1430° C., in other embodiments less than 1420° C. In some embodiments, the hold temperature in the hold stage stays between 1300 and 1430° C., in some embodiments between 1380 and 1430° C., in some embodiments between 1380 and 1420° C., in other embodiments between 1300 and 1400° C., and in still other embodiments, between 1350 and 1400° C.; these can correspond to the lower and upper soak temperatures, respectively. The temperature of the firing environment in the hold stage is held between the upper and lower soak temperatures for a hold time sufficient to allow a predominant solid crystal phase of the ceramic material to form. Preferably, one of the inorganic components has the lowest inorganic component melting point temperature, and the firing environment in the fast-ramp stage is held at one or more temperatures and for a time sufficient to cause at least a portion of the inorganic component with the lowest inorganic component melting point temperature to melt in the fast-ramp stage.

Preferably, the firing environment in the fast-ramp stage increases from an initial temperature of 1200° C. to the peak temperature at a ramp-up rate of preferably greater than 30° C. per hour, more preferably greater than 50° C. per hour, in some embodiments greater than 75° C. per hour, in other embodiments greater than 100° C. per hour, in other embodiments greater than 120° C. per hour.

In some embodiments, the firing environment in the fast-ramp stage increases from an initial temperature of 1200° C. to the peak temperature in less than 5 hours, in other embodiments less than 4 hours, and in other embodiments less than 3 hours.

Preferably, the peak portion lasts for less than 2 hours, more preferably less than 1 hour, and in some embodiments less than 0.5 hour.

Preferably, the temperature of the firing environment in the fast-ramp stage decreases from the peak temperature to the upper soak temperature at a ramp-down rate more negative than −30° C. per hour, in other embodiments less than −50° C. per hour, in other embodiments less than −75° C. per hour, and in other embodiments less than −100° C. per hour.

In some embodiments, the temperature of the firing environment decreases from the peak temperature to the upper soak temperature in less than 2 hours [1 hour, 0.5 hour].

In some embodiments, the temperature of the firing environment in the hold stage does not vary by more than 25° C.

Preferably, the temperature of the firing environment in the hold stage is held between the upper and lower soak temperatures for greater than 2 hours, in some embodiments greater than 5 hours, in other embodiments greater than 10 hours, and in other embodiments between 5 and 10 hours.

Preferably, the lower soak temperature is greater than the amorphous-phase glass transition temperature of the ceramic.

Preferably, the temperature of the firing environment is held within the hold zone for greater than 0.5 hour, more preferably greater than 1 hour, even more preferably greater than 1.5 hours, in some embodiments greater than 2 hours, and in other embodiments greater than 0.5 hours and less than 9 hours.

Preferably, after the hold stage, the cooling rate after the hold stage is slow enough to produce no cracking and is dependent on, for example, the size of the part fired; in some embodiments, the temperature of the firing environment decreases at a rate of more negative than −100° C./hour.

In some embodiments, at least one of the inorganic ceramic-forming components is selected from the group consisting of magnesium, clay, alumina, and silica sources, and mixtures thereof; in one example, the inorganic ceramic-forming components for cordierite include magnesium (e.g. talc), clay and alumina sources.

In some embodiments, a narrow pore size distribution is obtained with a span of the pore distribution of the porous ceramic article having a value of less than 0.95. In some embodiments, the value of function $(d_{50}-d_{10})/d_{50}$ for the porous ceramic article is less than 0.24.

As disclosed herein, the green body can either be conveyed through an oven, or the green body can remain stationary in an oven, or a combination thereof, in order for the green body to be exposed to the various stages of the firing environment.

Other features and advantages of the invention will be apparent from the following description and the appended claims.

BRIEF DESCRIPTION OF THE DRAWINGS

The accompanying drawings, described below, illustrate typical embodiments of the invention and are not to be considered limiting of the scope of the invention, for the invention may admit to other equally effective embodiments. The figures are not necessarily to scale, and certain features and certain view of the figures may be shown exaggerated in scale or in schematic in the interest of clarity and conciseness.

DETAILED DESCRIPTION

Figure 1:
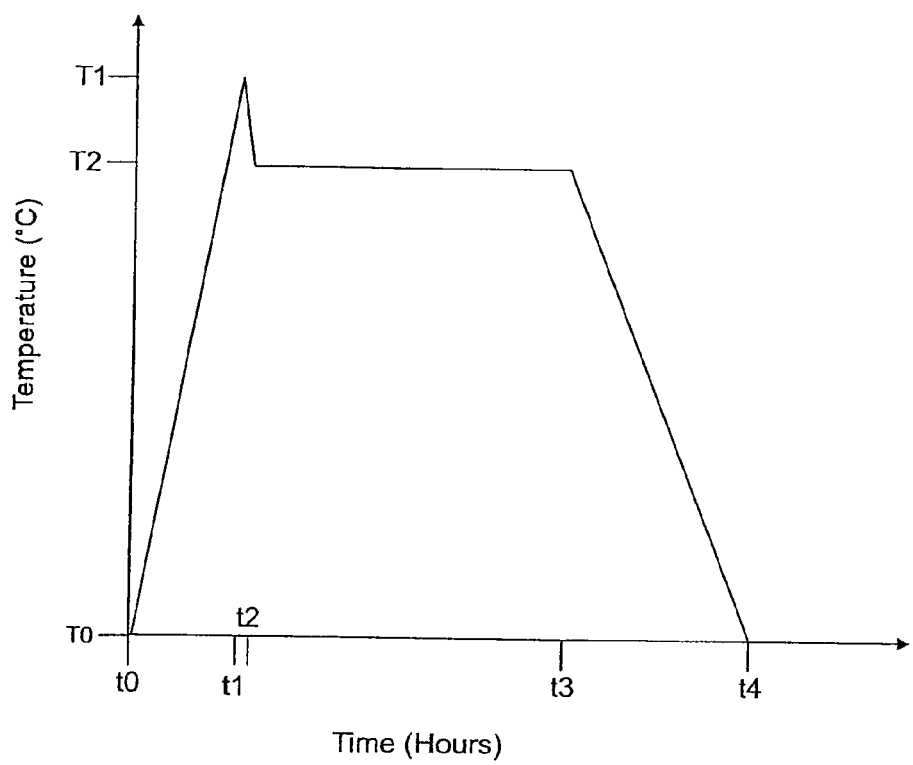
FIG. 1 depicts a firing schedule for controlling viscous flow mechanism and crystallization process to achieve narrow pore distribution and low coefficient of thermal expansion according to one set of embodiments disclosed herein.

The invention will now be described in detail with reference to a few preferred embodiments, as illustrated in the accompanying drawings. In describing the preferred embodiments, numerous specific details are set forth in order to provide a thorough understanding of the invention. However, it will be apparent to one skilled in the art that the invention may be practiced without some or all of these specific details. In other instances, well-known features and/or process steps have not been described in detail so as not to unnecessarily obscure the invention. In addition, like or identical reference numerals are used to identify common or similar elements.

In a process for making porous ceramic articles, a green body can be prepared by extruding or otherwise molding a plasticized batch of ceramic-forming raw materials, pore formers, organic binder, and solvent. The ceramic-forming raw materials are typically inorganic materials. As an example, the ceramic-forming raw materials may be cordierite-forming raw materials. These cordierite-forming raw materials may include, for example, alumina and silica and may further include one or more of clay, talc, and titania, as well as alkaline earth metals. The ceramic-forming raw materials may include a nano-particulate material, e.g., one having a mean particle diameter less than 100 μm, to reduce the melting point of the ceramic-forming raw materials. For example, talc may be provided as a nano-particulate material. The pore former included in the green body may be selected from carbon (e.g., graphite, activated carbon, petroleum coke, carbon black), starch (e.g., corn, barley, bean, potato, rice, tapioca, pea, sago palm, wheat, canna), and polymer (e.g., polybutylene, polymethylpentene, polyethylene, polypropylene, polystyrene, polyamides, epoxies, acrylonitrile butadiene styrene, acrylics, polyesters). A porous ceramic article having high mechanical strength can be made by drying and then firing the green body. The firing process typically can include a thermal debinding process, occurring at temperatures typically less than 650° C., and a sintering process, occurring at temperatures typically greater than 1000° C.

Without needing or desiring to be bound by any particular theory, it is believed that both organic and inorganic raw materials contribute to the overall pore distribution of a porous ceramic article; for example two Gaussian functions can be used to describe the pore distribution of a porous ceramic article: a broad Gaussian distribution dominated by the inorganic material (ceramic-forming raw materials) particle distribution from multiple components, and a narrow Gaussian distribution influenced by the organic material (e.g. pore former) particle distribution. It is believed that by using the control of sintering kinetics, the fine pores on the broad inorganic material dominated Gaussian distribution profile can be diminished by fusing the fine pores from the inorganic particle packing so that the overall pore distribution profile becomes narrower by the relative enhancement of the contribution of the narrow organic material dominated pore distribution profile, wherein the sintering kinetics are controlled through viscous flow, by higher peak temperature and ramping speed over heating. In addition, it is believed that a low coefficient of thermal expansion can be achieved by accelerating the crystallization speed to generate high crystal orientation and more micro-cracks, wherein the crystallization speed is accelerated by lowering the soaking temperature from the peak temperature.

The method disclosed herein preferably produces a porous ceramic article having a narrow pore distribution via sintering kinetics. Pore distribution is defined in terms of parameters $d_n$, as measured by mercury porosimetry, where n is an integer. The quantity $d_n$ is the pore diameter at which (100−n) % of the open porosity of the ceramic has been intruded by mercury. The quantity $d_n$ is the pore diameter at which n % of the pore volume is comprised of pores whose diameters are smaller than the value of $d_n$ or at which $(100-n)\%$ of the open porosity of the ceramic has been intruded by mercury. Parameters $d_1$, $d_{10}$, $d_{50}$, and $d_{90}$ are useful in quantifying pore distribution. The quantity $(d_{50}-d_{10})/d_{50}$ describes the width of the distribution of pore sizes finer than the median pore size, $d_{50}$. The quantity $(d_{90}-d_{10})/d_{50}$, referred to as the span, describes the breadth of a particle distribution. The smaller the span, the narrower the particle distribution.

Using the method of the invention, a porous ceramic article having the following properties has been achieved: $(d_{50}-d_{10})/d_{50}$ less than 0.5, span less than 1.0, coefficient of thermal expansion less than $3.0\times10^{-7}/°$ C., mean pore size greater than 10 μm, and porosity of at least 42%. Table I lists properties of some porous ceramic articles produced by the method of the invention.

TABLE I

| Example | Porosity (%) | $d_{50}$ | $(d_{50} - d_{10})/d_{50}$ | CTE ($\times 10^{-7}$° C.) at RT-800° C. |
|---|---|---|---|---|
| A | 42-44 | >14 | <0.3 | 0.2 |
| B | 48-50 | >16 | <0.28 | 0.3 |
| C | >55 | >18 | <0.26 | 0.4 |

In one set of embodiments, and referring to FIG. 1, firing of the green body according to the method disclosed herein may be carried out in a furnace, such as an oxygen-controlled furnace. The firing schedule includes a fast-ramp stage in which the temperature of the firing environment is raised from an initial temperature T0 to a peak temperature T1 from time t0 to time t1, whereby the green body disposed therein is heated. The temperature is raised at an average ramp-up rate greater than 0.5° C./min, preferably greater than 1° C./min, more preferably greater than 1.5° C./min. The initial temperature is greater than 1000° C., such as 1200° C., or 1100° C. as shown. The peak temperature T1 is a temperature above which a ceramic phase will form. Preferably, the peak temperature is close to a melting point of the ceramic phase, preferably within 10-20° C. of the melting of the ceramic phase. For example, if the ceramic phase is cordierite, the peak temperature is preferably above 1400° C., in some embodiments between 1420° C. and 1470° C., and in other embodiments between 1420° C. and 1435° C.

In FIG. 1, the fast ramp up in temperature in the fast-ramp stage is immediately followed by a fast ramp down in temperature in which the temperature of the firing environment is decreased from the peak temperature T1 to a soaking temperature T2 from time t1 to t2. The temperature decreases at an average ramp-down rate lower than −0.5° C./min, preferably lower than −1° C./min, more preferably lower than −1.5° C./min. The soaking temperature T2 is a temperature in a range of temperatures at which the ceramic phase will form. Preferably, the soaking temperature T2 is at least 15° C. below the peak temperature. Preferably, the soaking temperature T2 is above 1300° C.

The fast-cool stage is immediately followed by a hold stage in which the heated/cooled green body is held on average at the soaking temperature T2 for a time sufficient (t2 to t3) to complete the formation of the ceramic phase, where the soaking temperature T2 is lower than the peak temperature T1 as described above. For example, the hold time may be between 4 and 20 hours. During the hold stage, the temperature of the furnace may fluctuate but should generally average to the soaking temperature T2. The hold stage is followed by a cool stage in which the ceramic article is cooled from the soaking temperature T2 to the initial temperature T1 from time t3 to t4, and may be further cooled to room temperature.

The following examples are provided for illustration purposes and are not to be construed as limiting the invention as otherwise described herein.

Table II shows examples of batches including ceramic-forming raw materials, pore former, organic binder, and solvent. Each batch was prepared by combining and dry mixing the inorganic components (ceramic-forming raw materials). The pore former was added to the mixture of inorganic components, followed by the organic binder, followed by the solvent. The resulting plasticized ceramic batch mixture was extruded through an extrusion die to form one or more green honeycomb bodies, each having a diameter of 5.66 in.

TABLE II

| CERAMIC-FORMING RAW MATERIALS (INORGANIC MATERIALS) | | | A | B | C |
|---|---|---|---|---|---|
| Magnesium ources: | FCOR Talc | wt % | 40.7 | 39.5 | 39.15 |
| Average of Median Particle Sizes of Talc Sources | | micron | 25 | 25 | 25 |
| Alumina Sources: | Alumina (calcined) C701 RGE | wt % | 14.8 | 12.0 | |
| | Alumina (hydrated) AC410 | wt % | 16.0 | | |
| | A3000 | | | | 11.44 |
| | Kaolin (hydrous) Kaopaque10 (K10) | wt % | 16.0 | 17.2 | 16.93 |
| | Aluminum Trihydrate AC714 | | | 16.00 | 9.75 |
| Average of Median Particle Sizes of Alumina Sources | | micron | 6 | 4 | 2 |
| Silica Sources | Cerasil 300 | wt % | 12.5 | | |
| | Unimin Silverbond 200 | wt % | | 13.5 | 13.75 |
| Average of Median Particle Sizes of Silica Sources | | micron | 27 | 26 | 26 |
| PORE FORMER | Potato Starch Superior | wt % | 10 | 12 | 10 |
| ORGANIC BINDER | Methylcellulose Methocel CMC F240 | wt % | 4.0 | 4.0 | 4.0 |
| | Sodium Stearate Liga | | 1.0 | | |
| Nanobinder | AL20 (10% Al2O3) | wt % | | 18 | 18 |
| "T" Surfactant | | wt % | | | 8 |
| Cross linker | Berset 2700 | wt % | | | 0.5 |
| SOLVENT | Water | | | | |

Figure 2:
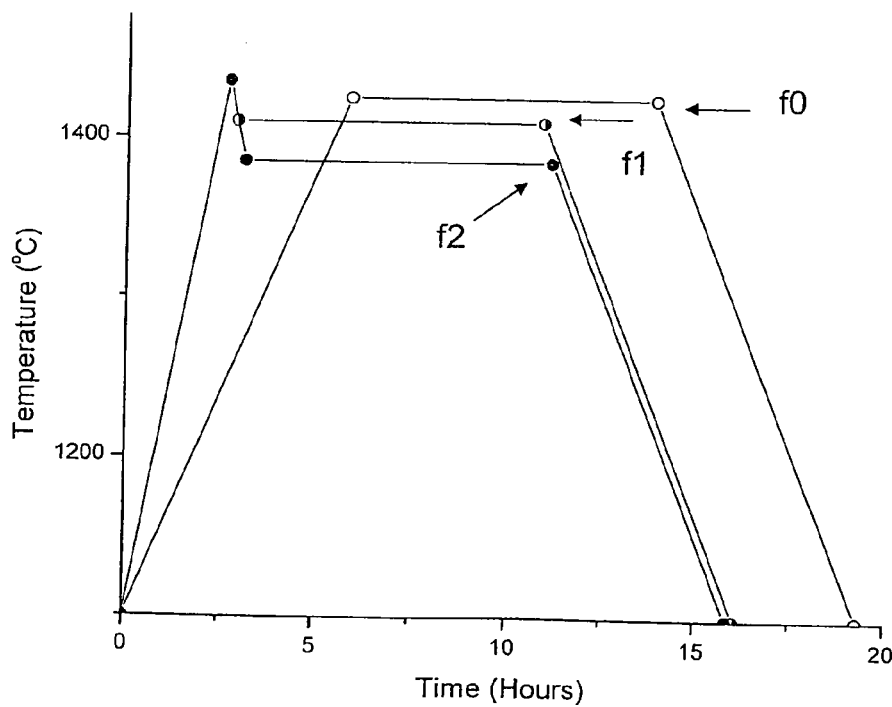
FIG. 2 depicts various firing schedules as disclosed herein and similar to FIG. 1 and a comparative firing schedule that has no peak portion.

Samples of green honeycomb bodies formed from batches as depicted in Table II and according to the method described above were dried. Thereafter, they were subjected to firing using firing schedules f0, f1, f2, as shown in FIG. 2. Firing schedule f0 is an example of a firing schedule without a peak portion and includes heating from an initial temperature of 1100° C. to 1425° C. at an average rate of 1° C./min, holding at 1425° C. for 8 hours, and then cooling down to the initial temperature. Peak firing schedule f1, according to one embodiment disclosed herein, includes heating from an initial temperature of 1100° C. to a peak temperature of 1435° C. at an average rate of 2° C./min, immediately followed by cooling from the peak temperature of 1435° C. to a soaking temperature of 1410° C. at an average rate of −2° C./min, followed by holding on average at the soak temperature of 1410° C. for 8 hours, and then cooling down to the initial temperature. Peak firing schedule f2, according to another embodiment disclosed herein, includes heating from an initial temperature of 1100° C. to a peak temperature of 1435° C. at an average rate of 2° C./min, immediately followed by cooling from the peak temperature of 1435° C. to a soak temperature of 1385° C. at an average rate of −2° C./min, followed by holding on average at the soak temperature of 1385° C. for 8 hours, and then cooling down to the initial temperature.

Table III summarizes the microstructure/properties of porous ceramic articles formed after firing according to firing schedules f0, f1, f2.

TABLE III

| Ex. | Batch | Firing Schedule | Porosity (%) | $d_{50}$ | $d_{10}$ | $d_{90}$ | $(d_{50} - d_{10})/d_{50}$ | $(d_{90} - d_{10})/d_{50}$ | CTE (/° C.) |
|---|---|---|---|---|---|---|---|---|---|
| 1 | A | f0 | 51.5 | 20.50 | 13.09 | 37.31 | 0.361 | 1.181 | $5.0 \times 10^{-7}$ |
| 2 | A | f1 | 48.0 | 26.69 | 20.38 | 44.77 | 0.237 | 0.913 | $5.1 \times 10^{-7}$ |
| 3 | B | f0 | 52.5 | 16.40 | 9.26 | 33.19 | 0.405 | 1.459 | $3.7 \times 10^{-7}$ |
| 4 | B | f1 | 49.3 | 22.46 | 15.37 | 42.91 | 0.316 | 1.226 | $2.2 \times 10^{-7}$ |
| 5 | B | f2 | 48.8 | 20.42 | 14.04 | 36.26 | 0.313 | 1.088 | $3.1 \times 10^{-7}$ |
| 6 | C | f0 | 51.6 | 15.21 | 8.95 | 32.45 | 0.411 | 1.545 | $2.8 \times 10^{-7}$ |
| 7 | C | f1 | 44.9 | 18.59 | 13.03 | 29.98 | 0.299 | 0.912 | $1.3 \times 10^{-7}$ |
| 8 | C | f2 | 45.5 | 16.69 | 11.47 | 26.44 | 0.313 | 0.896 | $2.0 \times 10^{-7}$ |

As seen in Table III, the porous ceramic articles fired using firing schedules f1 and f2 have narrower pore distribution in comparison to those fired using the firing schedule f0. Porous ceramic articles fired using firing schedule f2 have narrower pore distribution in comparison to those fired using the firing schedule f1, the difference between firing schedules f1 and f2 being the soaking temperature. In f2, the soaking temperature is lower. In some embodiments, higher filtration efficiency is expected with lower soaking temperature.

Figure 3:
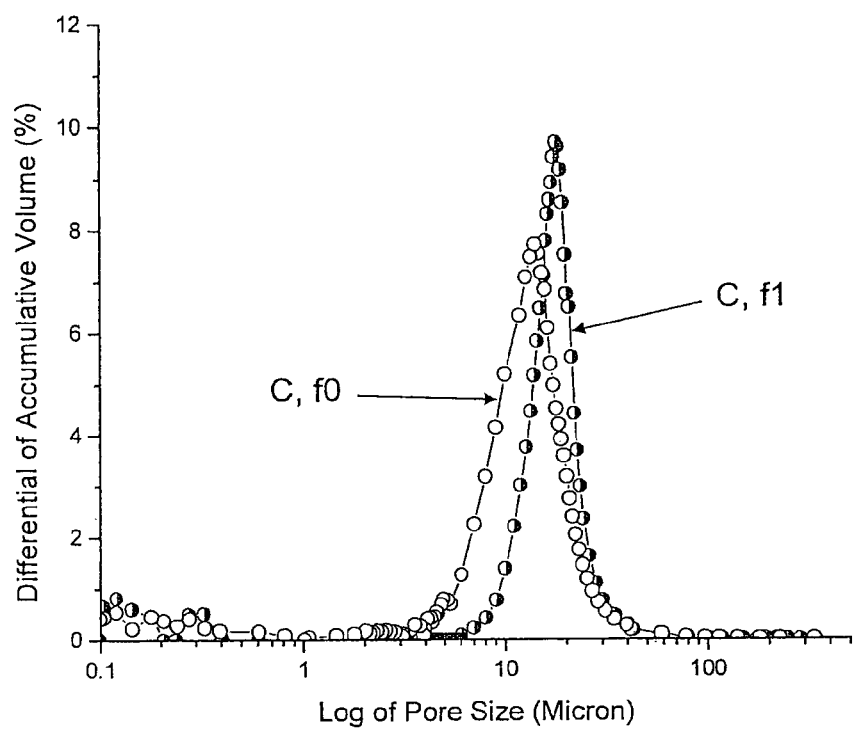
FIGS. 3 and 4 are pore distributions in green bodies fired according to the firing schedules depicted in FIG. 2.
Figure 4:
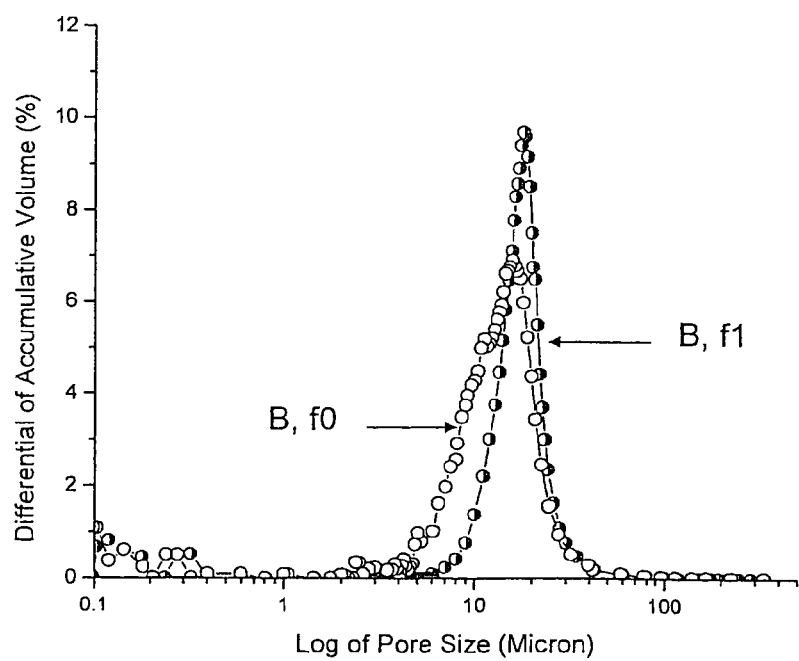

FIG. 3 compares graphically the pore distributions for porous ceramic articles of Examples 6 and 7 (Table III). FIG. 4 compares graphically the pore distributions for porous ceramic articles of Examples 3 and 4 (Table III). The pore distribution from the fast-peak/fast-cool/soak firing cycle (Examples 4, 7) has a much narrower distribution than that from the standard firing cycle (Examples 3, 6). The batches in the examples above used potato starch as the pore former. It is expected that replacing potato starch with a single model starch such as canna, sargo, green bean, and corn starch would further narrow the pore distribution of porous ceramic articles fired according to the firing schedule of the present invention.

Figure 5:
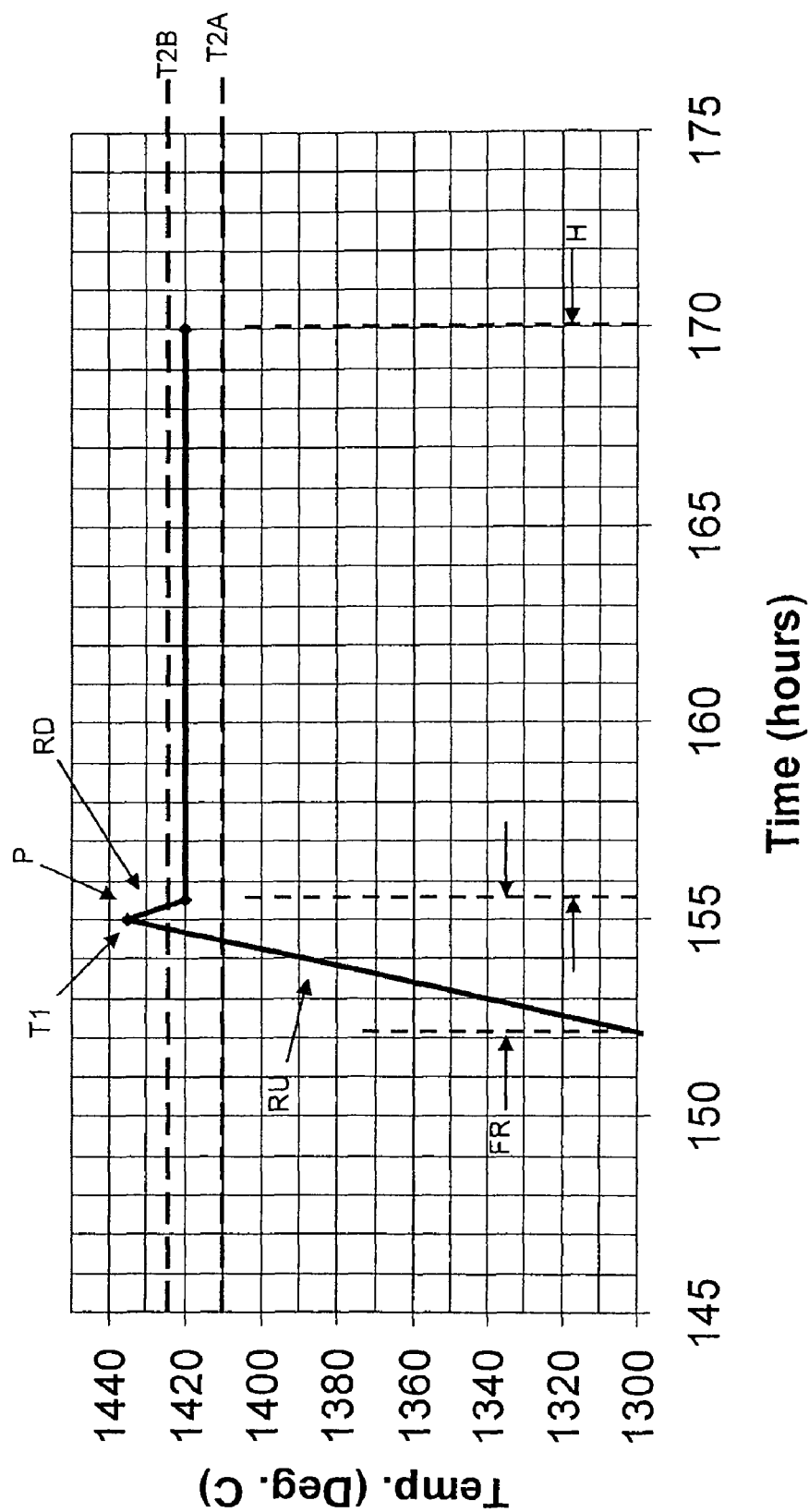
FIG. 5 depicts an embodiment of a firing schedule as disclosed herein.

FIG. 5 depicts an embodiment of a firing schedule as disclosed herein illustrating the fast ramp stage (FR), a region having a fast ramp up rate (RU) in temperature, a region having a fast ramp down rate (RD) in temperature, the peak portion (P) with a peak temperature (T1), lower soak temperature (T2A), and upper soak temperature (T2B). As illustrated for the embodiment in FIG. 5, the initial temperature at the start of the fast ramp stage is 1300° C.

Figure 6:
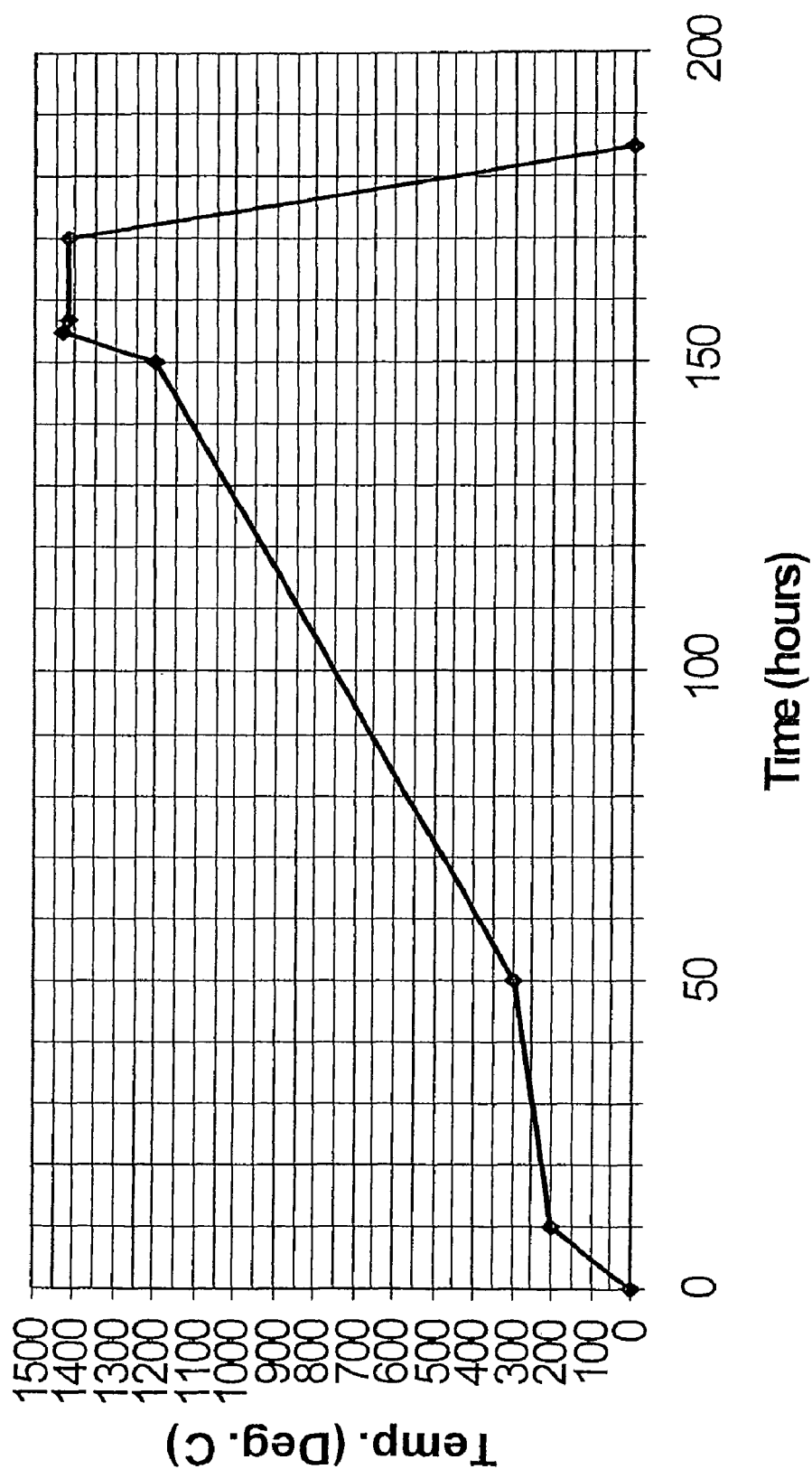
FIG. 6 depicts another embodiment of a firing schedule as disclosed herein.

FIG. 6 depicts another embodiment of a firing schedule illustrative of a set of embodiments as disclosed herein where the temperature in the firing environment to which the green body is exposed is varied both prior to the fast ramp stage, which here begins at 150 hours, as well as after the hold stage, which here ends at 170 hours, followed by lowering of the firing environment temperature to room temperature wherein the cooling rate is slow enough to produce no cracking and is dependent, for example, on the size of the part fired. An average firing rate may be employed, for example having an average rate of between about 20° C./hour and about 70° C./hour between room temp and about 1200° C. (here, 0 to 150 hours), and a pore former burnout stage can be provided (e.g. a hold or slight ramp within the range of pore former burnout temperature (such as shown from 10 to 50 hours at 200 to 300° C.), followed by an intermediate ramp up in temperature (shown from 50 hours to 150 hours, rising from 300° C. to 1200° C.). The firing cycle further comprises a fast ramp stage followed immediately by a hold stage, wherein the fast ramp stage comprises a relatively faster fast ramp-up rate at higher temperatures (above 1200° C.) to a peak temperature, which is preferably between 1430 and 1440° C., and in any case is at least 5° C. above the average temperature in the hold stage as well as a hold stage where the average temperature is held between 1415 and 1435° C., preferably above 1420° C., or even above 1425° C., and preferably between 1420° C. and 1435° C. whereby during the hold, the cordierite phase is formed. The fast ramp-up rate may be 50° C./hour or more, 75° C./hour or more, 100° C./hour or more, or even 120° C./hour or more. By utilizing the fast ramp-up rate above about 1200° C. in combination with and a relatively high hold temperature (above 1420° C.), unique microstructure characteristics of the porous ceramic article may be achieved. It is believed that the relative amount of fine porosity below 4.0 μm may be substantially reduced because of the promotion of viscous flow of the cordierite forming components such that the fine pores are filled by viscous flow of the components during the initial formation of the cordierite phase.

While the invention has been described with respect to particular embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of manufacturing an article of porous cordierite ceramic material, the method comprising:
   providing a green body comprised of inorganic cordierite-forming components;
   heating the green body of inorganic cordierite-forming components to produce the article of porous cordierite ceramic material comprising a porosity of greater than 42%, wherein heating the green body of inorganic cordierite-forming components comprises:
   exposing the green body to a firing environment in which a temperature of the firing environment is increased in a fast-ramp stage comprising a peak portion at a ramp-up rate of greater than 75° C. per hour from an initial temperature of 1200° C. to a peak temperature less than a melting point temperature of the cordierite ceramic material and greater than or equal to 1425° C., wherein the temperature of the firing environment in the peak portion is at all points greater than an upper soak temperature, the peak temperature being more than 5° C. greater than the upper soak temperature;

immediately decreasing the temperature of the firing environment from the peak temperature to a hold stage at a ramp-down rate more negative than −0.5° C./minute, immediately after which the temperature of the firing environment in the hold stage is between a lower soak temperature of about 1300° C. and the upper soak temperature of about 1430° C.;

and then holding the temperature of the firing environment between the lower soak temperature and the upper soak temperature of the hold stage for a hold time;

and then decreasing the temperature of the firing environment from the hold stage to the initial temperature in a cool stage immediately following the hold stage.

2. The method of claim 1 wherein the peak temperature is greater than an amorphous-phase glass transition temperature and less than the melting point temperature of the cordierite ceramic material.

3. The method of claim 1 wherein the peak temperature is no more than 1435° C.

4. The method of claim 1 wherein the firing environment in the fast-ramp stage increases from an initial temperature of 1200° C. to the peak temperature at a ramp-up rate of greater than 100° C. per hour.

5. The method of claim 1 wherein the firing environment in the fast-ramp stage increases from an initial temperature of 1200° C. to the peak temperature in less than 5 hours.

6. The method of claim 1 wherein the peak portion lasts for less than 2 hours.

7. The method of claim 1 wherein the temperature of the firing environment in the fast-ramp stage decreases from the peak temperature to the upper soak temperature at a ramp-down rate more negative than −30° C. per hour.

8. The method of claim 1 wherein the temperature of the firing environment decreases from the peak temperature to the upper soak temperature in less than 2 hours.

9. The method of claim 1 wherein the temperature of the firing environment in the hold stage does not vary by more than 25° C.

10. The method of claim 1 wherein the temperature of the firing environment in the hold stage is held between the upper and lower soak temperatures for a hold time sufficient to allow a predominant solid crystal phase of the ceramic material to form.

11. The method of claim 1 wherein the temperature of the firing environment in the hold stage is held between the upper and lower soak temperatures for greater than 2 hours.

12. The method of claim 1 wherein at least a portion of at least one of the inorganic components melts in the fast-ramp stage.

13. The method of claim 1 wherein the lower soak temperature is greater than an amorphous-phase glass transition temperature of the ceramic.

14. The method of claim 1 wherein the temperature of the firing environment is held within the hold stage for greater than 0.5 hour.

15. The method of claim 1 wherein at least one of the inorganic cordierite-forming components is selected from the group consisting of magnesium, alumina, and silica sources.

16. The method of claim 1 wherein a span of the pore distribution of the porous ceramic article is less than 0.95.

17. The method of claim 1 wherein the value of function $(d_{50}-d_{10})/d_{50}$ for the porous ceramic article is less than 0.24.

18. The method of claim 1 wherein the firing environment in the fast-ramp stage increases from an initial temperature of 1200° C. to the peak temperature at a ramp-up rate of greater than 120° C. per hour.

19. The method of claim 1 wherein the peak temperature is no more than 1440° C.

20. The method of claim 1 wherein the peak temperature is within 10-20° C. of the melting point of the cordierite material.

21. The method of claim 1 wherein the peak temperature is between 1430 and 1440° C.

22. The method of claim 1 wherein a width of a pore size distribution of the porous ceramic article is less than 0.5, a span of the pore size distribution of the porous cordierite ceramic article is less than 1.0, and a mean pore size of the pore size distribution of the porous ceramic article is greater than 10 microns.

23. The method of claim 1 wherein the porosity of the porous cordierite ceramic article is from about 42% to about 44%, a width of a pore size distribution of the porous cordierite ceramic article is less than 0.3, and a mean pore size of the pore size distribution of the porous cordierite ceramic article is greater than 14 microns.

24. The method of claim 1 wherein the porosity of the porous cordierite ceramic article is from about 48% to about 50%, a width of a pore size distribution of the porous cordierite ceramic article is less than 0.28, and a mean pore size of the pore size distribution of the porous cordierite ceramic article is greater than 16 microns.

25. The method of claim 1 wherein the porosity of the porous cordierite ceramic article is greater than 55%, a width of a pore size distribution of the porous cordierite ceramic article is less than 0.26, and a mean pore size of the pore size distribution of the porous cordierite ceramic article is greater than 18 microns.

* * * * *